(12) United States Patent
Kurtz et al.

(10) Patent No.: US 11,156,178 B2
(45) Date of Patent: Oct. 26, 2021

(54) DIESEL ENGINE PARTICULATE FILTER REGENERATION SYSTEM AND METHODS

(71) Applicant: Ford Global Technologies, LLC, Dearborn, MI (US)

(72) Inventors: Eric Matthew Kurtz, Dearborn, MI (US); Eric James Kastanis, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 408 days.

(21) Appl. No.: 15/702,364

(22) Filed: Sep. 12, 2017

(65) Prior Publication Data
US 2019/0078523 A1    Mar. 14, 2019

(51) Int. Cl.
| | |
|---|---|
| *F01N 3/00* | (2006.01) |
| *F02D 41/02* | (2006.01) |
| *F02D 41/40* | (2006.01) |
| *F02B 37/04* | (2006.01) |
| *F02B 75/28* | (2006.01) |
| *F01B 7/14* | (2006.01) |
| *F02D 41/30* | (2006.01) |
| *F02B 23/02* | (2006.01) |
| *F02B 39/04* | (2006.01) |
| *F02M 26/01* | (2016.01) |
| *F02D 41/38* | (2006.01) |
| *F02D 41/00* | (2006.01) |

(52) U.S. Cl.
CPC .............. *F02D 41/029* (2013.01); *F01B 7/14* (2013.01); *F02B 23/02* (2013.01); *F02B 37/04* (2013.01); *F02B 39/04* (2013.01); *F02B 75/28* (2013.01); *F02D 41/3094* (2013.01); *F02D 41/405* (2013.01); *F02M 26/01* (2016.02); *F02D 41/0062* (2013.01); *F02D 2041/389* (2013.01); *F02D 2400/04* (2013.01)

(58) Field of Classification Search
CPC .. F02D 41/029; F02D 41/405; F02D 41/3094; F02B 37/04; F02B 75/28; F02B 23/02; F02B 39/04; F02M 26/01; F01B 7/14
USPC .......................................................... 60/295
See application file for complete search history.

(56) References Cited

U.S. PATENT DOCUMENTS

| | | | |
|---|---|---|---|
| 8,078,392 B2 * | 12/2011 | Yahata ................. | F01N 3/0222 701/101 |
| 8,100,116 B2 | 1/2012 | He et al. | |
| 2007/0137179 A1 * | 6/2007 | Kondou ............... | F02D 41/027 60/285 |
| 2010/0223910 A1 * | 9/2010 | Funk .................... | F02D 41/029 60/277 |
| 2013/0167508 A1 * | 7/2013 | Nishimura ............ | F01N 9/002 60/274 |
| 2015/0033736 A1 | 2/2015 | Kalebjian et al. | |

(Continued)

*Primary Examiner* — Jason D Shanske
(74) *Attorney, Agent, or Firm* — Geoffrey Brumbaugh; McCoy Russell LLP (57) ABSTRACT

Methods and systems for supplying post injection fuel to a two stroke diesel engine are described. In one example, post injection fuel timing is adjusted responsive to an amount of internal residual combustion products in a cylinder so that less post injected fuel may be trapped in the cylinder for a subsequent cycle of the cylinder. The start of post injection fuel timing and the amount of post injection fuel may be adjusted responsive to internal residual in the cylinder.

14 Claims, 4 Drawing Sheets

(56) References Cited

U.S. PATENT DOCUMENTS

2019/0024552 A1* 1/2019 Uhrich .................. F02D 41/405
2019/0085778 A1* 3/2019 Kurtz ...................... F01N 3/025
2019/0325671 A1* 10/2019 Takasu ..................... G06N 3/04

* cited by examiner

DIESEL ENGINE PARTICULATE FILTER REGENERATION SYSTEM AND METHODS

BACKGROUND/SUMMARY

A diesel engine may include a particulate filter in its exhaust system to trap carbonaceous soot that may be produced as a byproduct of combustion. Over a period of time, the particulate filter may fill with soot such that it may provide a more significant restriction to exhaust gases. The particulate filter may be regenerated via increasing exhaust gas temperature and supplying an oxygen rich exhaust mixture to the particulate filter such that soot held within the particulate filter combusts, thereby regenerating the particulate filter.

One way to increase exhaust gas temperature is to supply fuel that has not participated in combustion within engine cylinders to an oxidation catalyst. The fuel combusts within the oxidation catalyst to increase exhaust gas temperature which then elevates particulate filter temperature so that soot in the particulate filter may combust, thereby regenerating the particulate filter. The fuel may be supplied to the oxidation catalyst via injecting post injection fuel pulses to a cylinder so that the fuel may be ejected from the cylinder during an exhaust stroke of the cylinder. Namely, expanding combustion gases exit the cylinder with fuel that has not participated in combustion when the cylinder's exhaust valves open. Most fuel that has been injected to the cylinder exits the cylinder because intake valve and exhaust valve overlap is small and because flow of exhaust gases and fuel back into the cylinder is reduced via exhaust valve closing. However, two stroke diesel engines may not include intake valves or exhaust valves to prevent exhaust and fuel from flowing back into the cylinder when post injection fuel pulses are provided to facilitate particulate filter regeneration. Further, exhaust ports and intake ports of a cylinder of a two stroke diesel engine may be open simultaneously for a long crankshaft angular duration such that exhaust and post injection fuel may be drawn back into the cylinder. Consequently, the post injection fuel may participate in combustion within the cylinder during a subsequent cylinder cycle, which may be undesirable. Therefore, it would be desirable to provide a way of regenerating a particulate filter of a two stroke diesel engine such that a significant portion of post injected fuel exits engine cylinders and reaches the oxidation catalyst to facilitate particulate filter regeneration.

The inventors herein have recognized the above-mentioned challenges and have developed a particulate filter regeneration method, comprising: receiving sensor data to a controller; and adjusting a post injection fuel pulse width provided to a second fuel injector of a cylinder via the controller in response to an amount of internal residual in the cylinder as estimated from the sensor data.

By adjusting a post injection fuel pulse width in response to an amount of internal residual, it may be possible to regenerate a particulate filter via injecting fuel to a cylinder of a two stroke diesel engine. Further, the present method may reduce or help to ensure that less fuel injected during one cylinder cycle is retained in a cylinder until a subsequent cylinder cycle. Reducing an amount of fuel retained from one cylinder cycle to a next cylinder cycle may reduce the possibility of auto-ignition of the fuel. Further, engine torque production may be made more consistent.

The present description may provide several advantages. Specifically, the approach may improve particulate filter regeneration for a two stroke diesel engine. Further, the approach may improve engine torque control via improving control of an amount of fuel combusted in a cylinder cycle. In addition, the approach may provide improved control over how much post injected fuel is ejected into an exhaust system for particulate filter regeneration.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
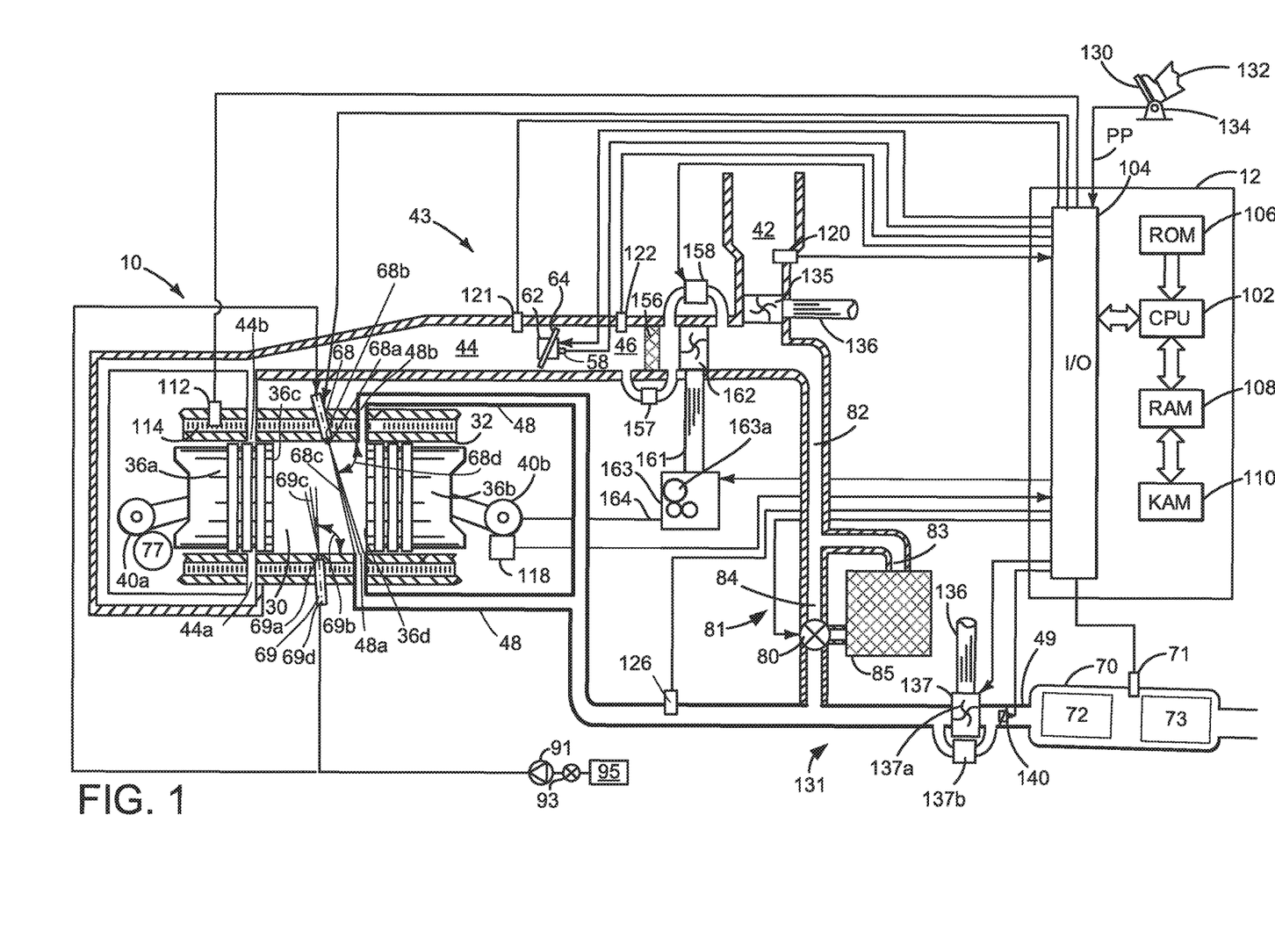
FIG. 1 shows a schematic depiction of an engine.
Figure 2:
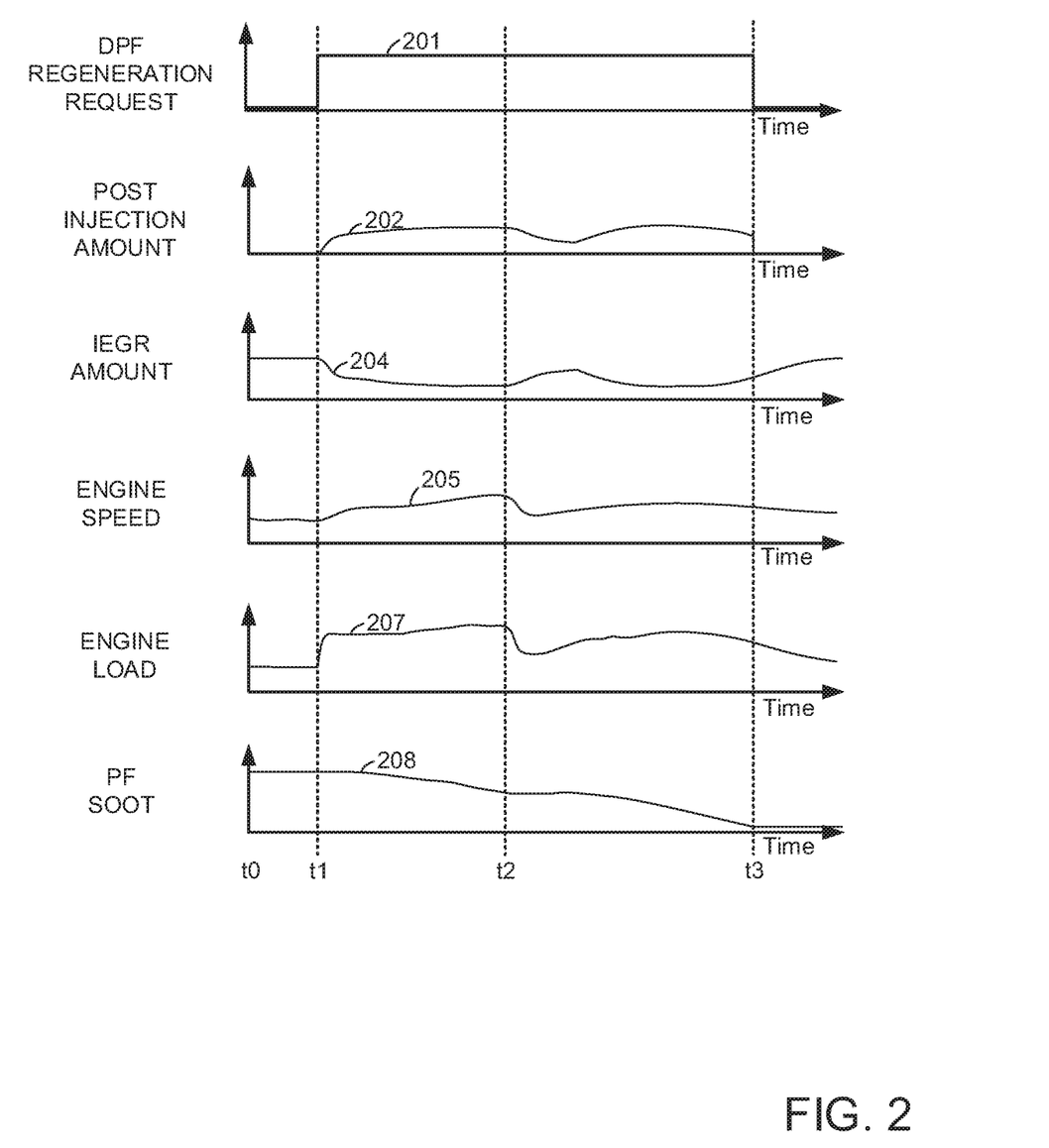
FIG. 2 shows an example particulate filter regeneration sequence.
Figure 3:
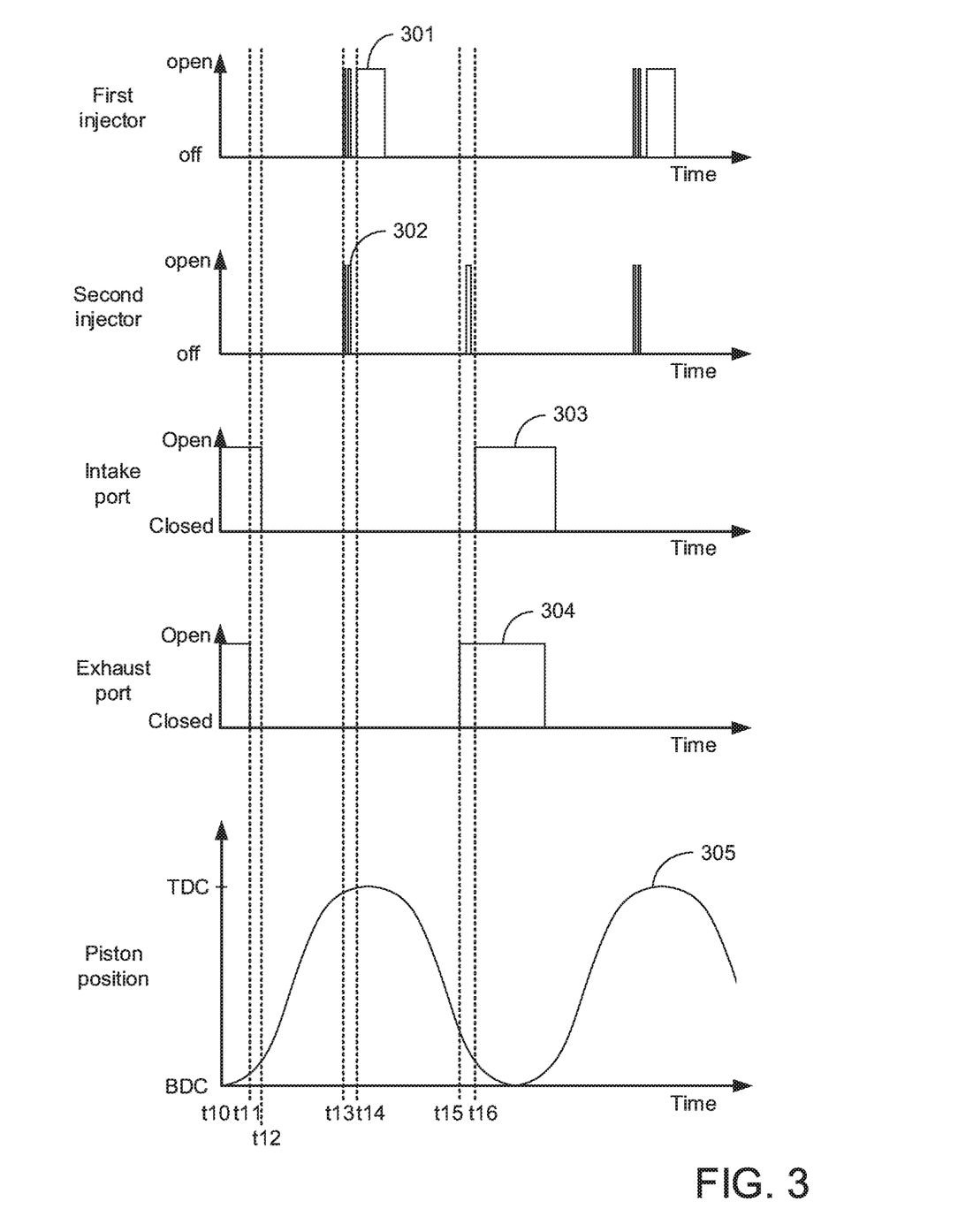
FIG. 3 shows post fuel injection timing relative to piston position.
Figure 4:
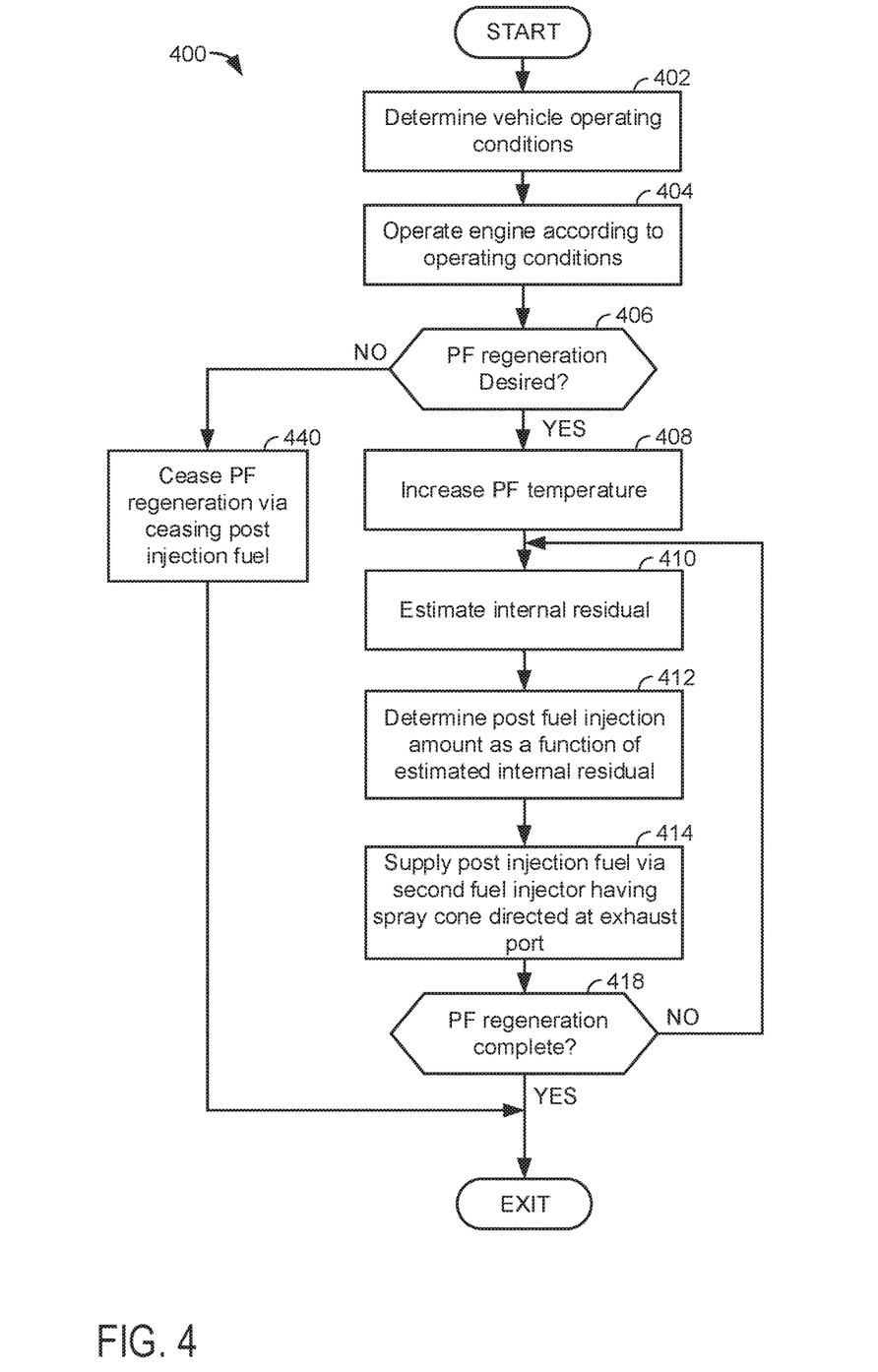
FIG. 4 is an example method for regenerating a particulate filter.

The present description is related to regenerating a particulate filter of a two stroke diesel engine. FIG. 1 shows one example of a boosted two stroke diesel engine. The diesel engine in FIG. 1 is an opposed piston engine, but the methods described herein may also be applied to two stroke engines that include a single piston in each engine cylinder. FIG. 2 shows an example particulate filter regeneration sequence. Fuel injection timing for a two stroke diesel engine is shown in FIG. 3. A method for regenerating a particulate filter is shown in FIG. 4.

Referring to FIG. 1, opposed piston internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes cylinder 30 and cylinder walls 32 with intake piston 36a and exhaust piston 36b positioned therein and connected to crankshafts 40a and 40b respectively. Crankshafts 40a and 40b may be coupled together via belts, chains or gears. Crankshafts 40a and 40b may be rotated by electric machine 77 (e.g., a starter motor) to crank engine 10. Cylinder 30 is shown communicating with intake manifold 44 and exhaust manifold 48 via intake ports 44a and 44b and exhaust ports 48a and 48b.

First fuel injector 69 and second fuel injectors 68 are shown positioned in cylinder walls 32 and they may inject fuel directly into cylinder 30, which is known to those skilled in the art as direct injection. Fuel is delivered to first fuel injector 69 and second fuel injector 68 by a fuel system including a fuel tank 95, fuel pump 91, fuel pump control valve 93, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump. First fuel injector is positioned such that its longitudinal axis 69d and fuel spray cone 69c are at an obtuse angle 69b from the portion of cylinder wall 32 that is located between fuel injector 69 and exhaust piston 36b. Thus, fuel spray cone 69c is pointed in a direction of intake piston 36a and away from exhaust piston 36b. Second fuel injector 68 may be positioned with its nozzle 68a pointed directly at exhaust port 48a. Second fuel injector 68 may deliver fuel in a fuel spray cone 68c impinges directly on exhaust port 48a when fuel is injected via second fuel injector 68. Alternatively, second fuel injector may be positioned such that its longitudinal axis 69b and fuel spray cone 68c are at an acute angle 68d from the portion of cylinder wall 32 that is located between fuel injector 68 and exhaust piston 36b. Thus, fuel spray cone 68c is pointed in a direction of exhaust piston 36b and away from intake piston 36a. In this way, nozzle 69a may direct fuel spray toward intake piston 36a and nozzle 68a may direct fuel spray toward exhaust piston 36b.

Intake manifold 44 is shown communicating with optional electronic throttle 62 which adjusts a position of throttle plate 64 to control air flow from intake boost chamber 46. Supercharger compressor 162 is mechanically driven and it draws air from downstream of turbocharger compressor 135. Turbocharger compressor 135 draws air from air intake 42. Supercharger compressor 162 supplies air to boost chamber 46. Exhaust gases spin turbocharger variable geometry turbine 137 which is coupled to turbocharger compressor 135 via shaft 136. Supercharger compressor 162 is mechanically driven via crankshaft 40b via shaft 161 and gear box 163, which may be coupled to crankshaft 40b via mechanism 164 (e.g., gears, a chain, or a belt). Supercharger gear box 163 includes a plurality of gear ratios for changing speed of supercharger compressor 162 relative to speed of crankshaft 40b. Supercharger compressor speed may be adjusted via selecting and engaging gears 163a of gear box 163. In one example, a given engine crankshaft speed may rotate supercharger compressor 162 at a first speed and a second speed via switching between a first gear ratio and a second gear ratio in gear box 163.

Supercharger compressor bypass valve 158 may be selectively opened to reduce air pressure in boost chamber 46 and return air and exhaust gas recirculation (EGR) to upstream of supercharger compressor 162. In some examples, a charge air cooler 156 may be provided downstream of supercharger compressor 162 to cool the air charge entering cylinder 30. Air charge cooler bypass valve 157 may be selectively opened to bypass charge air cooler 156. A positon of vane actuator 137a may be adjusted via controller 12 to increase or decrease rotational speed of turbine 137. In alternative examples, a waste gate 137b may replace or be used in addition to vane actuator 137a. Vane actuator 137a adjusts a position of variable geometry turbine vanes. Exhaust gases can pass through turbine 137 supplying little energy to rotate turbine 137 when vanes are in an open position. Exhaust gases can pass through turbine 137 and impart increased force on turbine 137 when vanes are in a closed position. Alternatively, wastegate 137b or a bypass valve allows exhaust gases to flow around turbine 137 so as to reduce the amount of energy supplied to the turbine.

In an alternative example, supercharger compressor 162 may be positioned upstream of turbocharger compressor 135. Further, an air charge cooler (not shown) maybe positioned downstream of where EGR passage 82 joins intake 43 between supercharger compressor 162 and turbocharger compressor 135. The air charge cooler would obviate the need for an EGR cooler.

Exhaust gases may be recirculated to cylinder 30 via EGR system 81. EGR system includes optional EGR cooler 85, EGR valve 80, EGR passage 82, EGR cooler bypass 84, and cooled EGR passage 83. Exhaust gases may flow from exhaust manifold 48 to the engine air intake 43 between supercharger compressor 162 and turbocharger compressor 135. EGR may flow to the engine air intake when pressure in exhaust manifold 48 is greater than pressure between turbocharger compressor 135 and supercharger compressor 162. EGR may flow through EGR cooler 85 to reduce engine exhaust gas temperatures. EGR may bypass EGR cooler 85 when engine exhaust temperatures are low.

Fuel may be injected to cylinder 30 when pistons 36a and 36b are approaching each other after intake piston 36a covers intake ports 44a and 44b and exhaust piston 36b covers exhaust ports 48a and 48b. The fuel may then be combusted with air in cylinder 30 when piston 36 is near top-dead-center compression stroke. The fuel and air ignite via compression ignition. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

Engine 10 does not include glow plugs or spark plugs since it is a compression ignition engine and since it does not include a cylinder head. Further, engine 10 does not include poppet valves to regulate air and exhaust flow into and out of cylinder 30.

Exhaust system 131 carries exhaust away from engine 10 and processes exhaust gases. Exhaust valve 140 is shown positioned in exhaust passage 49 downstream of turbine 137a and upstream of emissions device 70. Alternatively, exhaust valve 140 may be positioned downstream of emissions device 70. Exhaust valve 140 may be opened and closed to control pressure in exhaust manifold 48. Closing exhaust valve 140 restricts flow through exhaust valve 140 and may increase pressure in exhaust manifold 48. Opening exhaust valve 140 may improve flow through exhaust valve 140 and reduce pressure in exhaust manifold 48.

Emissions device 70 can include an oxidation catalyst 72 and particulate filter 73, in one example. In another example, multiple emission control devices, each with multiple bricks, can be used. Emissions device 70 can include an oxidation catalyst in one example. In other examples, the emissions device may include a lean NOx trap or a selective catalytic reduction (SCR), and/or a diesel particulate filter (DPF). Upstream temperature sensor 79 and downstream temperature sensor 81 provide exhaust gas temperature measurements for determining the change in exhaust gas temperature across emissions device 70. Differential pressure sensor 71 provides a differential pressure change across emissions device 70, which may be the basis for judging if emissions device 70 needs to be regenerated.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44; boost pressure from pressure sensor 122; exhaust gas oxygen concentration from oxygen sensor 126; an engine position sensor from a Hall effect sensor 118 sensing crankshaft 40b position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a two stroke cycle: the cycle includes a first stroke where the intake piston 36a travels toward exhaust piston 36b and exhaust piston 36b travels toward intake piston 36a. In the second stroke, intake piston 36a travels away from exhaust piston 36b and exhaust piston 36b travels away from intake piston 36a. Intake piston 36a controls flow through intake ports 44a and 44b. Exhaust piston 36b controls flow through exhaust ports 48a and 48b. In this example, exhaust piston 36b leads intake piston 36a by reaching a top dead center position (e.g., a maximum distance exhaust piston 36b is from crankshaft 40b) a few crankshaft degrees (e.g., depending on configuration, the difference may range between 0 and 20 crankshaft degrees) before intake piston 36 a reaches its top dead center position (e.g., maximum distance intake piston 36a is from crankshaft 40a). Thus, exhaust piston motion is offset from intake piston motion by a few crankshaft degrees. During the first stroke, generally, the intake piston 36a and exhaust piston 36b are moving toward each other to compress air that has entered cylinder 30. The stroke begins at bottom dead center (BDC) for intake piston 36a (intake piston 36a is closest distance to crankshaft 40a) and it ends at top dead center for intake piston 36a (intake piston 36a is at its farthest distance from crankshaft 40a). As previously mentioned, exhaust piston 36b leads intake piston 36a by a few degrees so that it is already traveling toward its TDC position when intake piston is at BDC. Further, exhaust piston 36b reaches its TDC position just before intake piston 36a reaches its TDC position. Exhaust piston 36b is located just after its TDC position when intake piston 36a reaches its TDC position. Cylinder volume is smallest when intake piston 36a and exhaust piston 36b are near their respective TDC positions. Air and fuel are compressed in cylinder 30 as intake piston 36a and exhaust piston 36b advance toward their respective TDC positions. Intake ports 44a and 44b are open and pressurized air flows into cylinder 30 when intake pistons 36a and exhaust piston 36b are near their respective BDC positions. Exhaust ports 48a and 48b are also open when intake piston 36a and exhaust piston 36b are near BDC. Supercharger compressor 162 and turbocharger compressor 135 provide pressurized air to intake manifold 44 which may flow into cylinder 30 when intake ports 44a and 44b are open. As intake piston 36a and exhaust piston 36b move toward their respective TDC positions, intake ports 44a and 44b are closed to prevent additional air from entering cylinder 36 and preventing backflow out of cylinder 36. After the intake ports 44a and 44b are closed, intake piston 36a and exhaust piston 36b continue to approach their respective TDC locations. After intake ports 44a and 44b close, crankshafts 40a and 40b rotate through a predetermined angle and then exhaust ports 48a and 48b are closed.

Thus, during the entire intake period, exhaust ports 44a and 44b are open. Fuel is injected to cylinder 30 after exhaust ports 44a and 44b close, then the fuel and air mixture is ignited when intake piston 36a and exhaust piston 36b are near their respective TDC locations. The fuel and air mixture is ignited by compression ignition and not via a spark plug or energy from a glow plug. Fuel may be injected to cylinder 30 via a plurality of injections including pilot injections, main injections, and post injections.

During the second stroke, generally, the intake piston 36a and exhaust piston 36b are moving apart from each other after combustion takes place in cylinder 30. The second stroke begins at TDC of intake piston 36a and it ends at BDC of intake piston 36a. Intake piston 36a and exhaust piston 36b approach their respective BDC positions near where volume of cylinder 30 is greatest. Gases expanding in cylinder 30 push intake piston 36a and exhaust piston 36b apart toward their respective BDC positions. Exhaust piston 36b passes exhaust ports 48a and 48b as it travels toward its BDC. Exhaust ports 48a and 48b are uncovered when top of exhaust piston 36d passes exhaust ports 48a and 48b while exhaust piston 36b is traveling toward crankshaft 40b. Exhaust gases exit cylinder 30 after exhaust piston 36b passes exhaust ports 48a and 48b while traveling toward bottom dead center. Intake pistons 36a and exhaust piston 36b travel further toward their respective bottom dead center positions, and after a predetermined actual total number of crankshaft degrees, intake piston 36a uncovers intake ports 44a and 44b. Intake ports 44a and 44b are uncovered when top of intake piston 36c passes intake ports 44a and 44b while intake piston 36a is traveling toward crankshaft 40a. Fresh air enters cylinder 30 via intake ports 44a and 44b when intake ports 44a and 44b are uncovered. Exhaust ports 48a and 48b are open or uncovered the entire time when intake ports 44a and 44b are open or uncovered. Intake piston 36a and exhaust piston 36b continue to travel toward their respective BDC locations. After intake piston reaches BDC the cylinder cycle repeats.

Thus, the engine cycle is comprised of two strokes and the engine cycle is one engine revolution. Other engine cylinders operate in a similar way but these other cylinders may combust air and fuel out of phase with the cylinder shown. For example, top dead center compression stroke of one engine cylinder may be at zero crankshaft degrees while top dead center of another cylinder may be at one hundred and eighty crankshaft degrees.

Thus, the system of FIG. 1 provides for an engine system, comprising: an opposed piston diesel engine including a cylinder with a first fuel injector and a second fuel injector; a supercharger coupled to the opposed piston diesel engine, the supercharger having multiple drive ratios; a turbocharger coupled to the opposed piston diesel engine; and a controller including executable instructions stored in non-transitory memory to provide a late post fuel injection amount during a cycle of the cylinder only via the second fuel injector, and to provide main fuel injection amount during the cycle of the cylinder only via the first fuel injector. The engine system of further comprises additional instructions to adjust the post fuel injection amount in response to an amount of internal residual in the cylinder. The engine system includes where a start of post fuel injection is advanced in response to an increase in the amount of internal residual. The engine system includes where an end of post fuel injection is advanced in response to an increase in the amount of internal residual. The engine system includes where a start of post fuel injection is retarded in response to a decrease in the amount of internal residual. The engine system further comprises additional instructions to adjust an internal exhaust gas recirculation in response to engine speed and load.

Referring now to FIG. 2, an example particulate filter regeneration sequence according to method 400 is shown. The particulate filter regeneration sequence of FIG. 2 may be for the engine and system shown in FIG. 1. The vertical lines at times t0-t3 represent times of interest in the sequence. The plots are aligned in time and occur at the same time. In this example particulate filter regeneration sequence, post fuel injection amount is adjusted responsive to internal residual within an engine cylinder. Internal residual is byproducts of combustion (e.g., exhaust gases CO, HC, NOx) that may remain in a cylinder from one combustion event (e.g., compression ignition and combustion of air and fuel in a cylinder) to a next subsequent combustion event in the cylinder.

The first plot from the top of FIG. 2 is a plot of a diesel particulate filter (DPF) regeneration request versus time. Trace 201 represents diesel particulate filter regeneration state. The vertical axis represents diesel particulate filter regeneration state and the diesel particulate filter regeneration request is asserted when trace 201 is at a high level near the vertical axis arrow. The diesel particulate filter regeneration request is not asserted when trace 201 is at a lower level near the horizontal axis. The horizontal axis represents time and time increases from the left side of the figure to the right side of the figure.

The second plot from the top of FIG. 2 is a plot of post fuel injection amount of fuel injected to a cylinder versus time. Trace 202 represents post fuel injection fuel amount. The vertical axis represents post fuel injection fuel amount and post fuel injection fuel amount increases in the direction of the vertical axis arrow. The horizontal axis represents time and time increases from the left side of the figure to the right side of the figure.

The third plot from the top of FIG. 2 is a plot of internal exhaust gas residual (IEGR) amount versus time. Trace 204 represents IEGR amount. The vertical axis represents IEGR amount and IEGR amount increases in the direction of the vertical axis arrow. The horizontal axis represents time and time increases from the left side of the figure to the right side of the figure.

The fourth plot from the top of FIG. 2 is a plot of engine speed versus time. Trace 205 represents engine speed. The vertical axis represents engine speed and the engine speed increases in the direction of the vertical axis arrow. The horizontal axis represents time and time increases from the left side of the figure to the right side of the figure.

The fifth plot from the top of FIG. 2 is a plot of engine load versus time. Trace 207 represents engine load. The vertical axis represents engine load and engine load increases in the direction of the vertical axis. The horizontal axis represents time and time increases from the left side of the figure to the right side of the figure.

The sixth plot from the top of FIG. 2 is a plot shoot amount accumulated in a particulate filter versus time. The vertical axis represents amount of soot accumulated in a particulate filter. Trace 206 represents the amount of particulate matter accumulated in the particulate filter. The horizontal axis represents time and time increases from the left side of the figure to the right side of the figure.

At time t0, the engine is operating and combusting air and fuel at a medium speed and load. DPF regeneration is not requested, but soot stored in the DPF is at a higher level. The IEGR amount is a medium level and the post fuel injection amount is zero.

At time t1, the DPF regeneration request is asserted in response to the accumulated soot amount and vehicle operating conditions. The post fuel injection amount begins to increase in response to the particulate filter regeneration request being asserted. The IEGR amount is decreased in response to the engine load increasing. Engine speed begins to increase in response to engine load increasing. The engine load increase may be based on a higher driver demand torque (not shown). The particulate filter accumulated soot amount begins to decrease.

Between time t1 and time t2, the engine speed continues to increase and the engine load also increases. The IEGR amount is decreased in response to the engine speed and load. The post fuel injection amount is increased in response to the decreased IEGR amount. The post fuel injection amount may be increased in response to the decreased IEGR amount since the decreased IEGR amount may be indicative that less post fuel injection fuel may be retained in the cylinder until a next cylinder cycle. Therefore, an increased amount of fuel may be post injected to the cylinder and ejected to the engine exhaust system so as to not remain in the cylinder during a next cycle of the cylinder. The post injected fuel may then increase exhaust temperature to regenerate the particulate filter. The particulate filter soot amount decreases as the engine exhaust gas temperature increases (not shown).

At time t2, the engine load is decreased in response to decreased driver demand torque (not shown). Engine speed begins to decrease in response to the decrease in engine load. The IEGR amount is increased in response to the decreased engine load. The post injection fuel amount is decreased in response to the increasing IEGR amount so that less fuel may be carried in the cylinder until the next cylinder cycle. The soot amount continues to decrease and the particulate filter regeneration request remains asserted.

Between time t2 and time t3, the engine load increases after it is decreased and the engine speed begins to increase. The IEGR amount is increased in response to the engine load increasing and the engine speed increasing. The post fuel injection fuel amount is increased in response to the IEGR decrease and the soot stored in the particulate filter continues to decrease. The particulate filter regeneration request remains asserted.

At time t3, the soot stored in the particulate filter is less than a threshold, so the particulate filter regeneration request is withdrawn. The post fuel injection fuel amount is adjusted to zero and the IEGR amount is based on engine speed and load. Engine speed and load are responsive to driver demand torque (not shown).

In this way, a post fuel injection fuel amount may be adjusted responsive to the IEGR amount. Further, start of injection timing and end of injection timing for post injected fuel may also be adjusted responsive to the IEGR amount. By adjusting the post fuel injection amount responsive to the IEGR amount, the amount of fuel supplied to the oxidation catalyst may be adjusted while at the same time controlling an amount of post injected fuel that may remain in the cylinder for a next cycle of the cylinder. Thus, it may be possible to facilitate particulate filter regeneration via increasing temperature of gases exiting an oxidation catalyst while reducing the possibility of igniting post injection fuel in a cylinder during a subsequent cycle of the cylinder.

Referring now to FIG. 3, an example fuel injection sequence according to method 400 is shown. The example fuel injection sequence takes place during particulate filter regeneration. The fuel injection sequence of FIG. 3 may be for the engine and system shown in FIG. 1. The vertical lines at times t10-t15 resent times of interest in the sequence. The plots are aligned in time and occur at the same time. In this example, post fuel injection is performed via a second fuel injector having a nozzle that is pointed directly at an exhaust port.

The first plot from the top of FIG. 3 is a plot of fuel injection pulses delivered to a cylinder via a first fuel injector (e.g., injector 69 of FIG. 1). The fuel pulses are delivered during regeneration of a particulate filter. Trace 301 represents fuel injection pulses from a first fuel injector. The amount of fuel injected to the cylinder increases as the pulse widths increase, and the amount of fuel injected to the cylinder decreases as the pulse widths decreases. The horizontal axis represents time and time increases from the left side of the figure to the right side of the figure.

The second plot from the top of FIG. 3 is a plot of fuel injection pulses delivered to a cylinder via a second fuel injector (e.g., injector 68 of FIG. 1). The fuel pulses are delivered during regeneration of a particulate filter. Trace 302 represents fuel injection pulses from a second fuel injector. The amount of fuel injected to the cylinder increases as the pulse widths increase, and the amount of fuel injected to the cylinder decreases as the pulse widths decreases. The horizontal axis represents time and time increases from the left side of the figure to the right side of the figure. The nozzle of the second fuel injector is pointed directly at an exhaust port such that a fuel spray cone from the second fuel injector impinges directly on the exhaust port.

The third plot from the top of FIG. 3 is a plot of cylinder intake port opening and closing versus time. Trace 303 represents intake port state. The vertical axis represents cylinder intake port state and the cylinder port is open when trace 303 is at a higher level near the vertical axis arrow. The intake port is closed when trace 303 is at a lower level near the horizontal axis. The horizontal axis represents time and time increases from the left side of the figure to the right side of the figure.

The fourth plot from the top of FIG. 3 is a plot of cylinder exhaust port state versus time. Trace 304 represents exhaust port state. The vertical axis represents exhaust port state and the exhaust port is open when trace 304 is at a higher level near the vertical axis arrow. The exhaust port is closed when trace 304 is near the horizontal axis. The horizontal axis represents time and time increases from the left side of the figure to the right side of the figure.

The fifth plot from the top of FIG. 3 is a plot of piston position versus time. Trace 305 represents piston position of an intake piston 36a. The piston is at its top dead center position when trace 305 is at the level of the vertical axis labeled TDC. The piston is at its bottom dead center position when trace 305 is at the level of vertical axis labeled BDC. The horizontal axis represents time and time increases from the left side of the figure to the right side of the figure.

At time t10, the piston is at BDC and the intake and exhaust ports are open. Fuel is not being injected via the first and second fuel injectors. The engine rotates and at time t11, the exhaust port is closed while the intake port remains open. Fuel is not injected via the first and second fuel injectors. The engine continues to rotate and then the intake port closes at time t12. Fuel still is not injected at time t12 and the engine continues to rotate as time increases. The exhaust port remains closed. As the piston approaches TDC, pilot fuel injections are provided at time t13. In this example, pilot fuel injections are provided via the first and second fuel injectors, but in some examples, the pilot fuel injections may be provided by only the first fuel injector. Two pilot fuel injections are provided. Then at time t14, a main fuel injection pulse is provided via the first fuel injector. However, in other examples, a main fuel injection pulse may also be provided via the second injector. The engine compresses the injected fuel and the air-fuel mixture ignites.

At time t15, post fuel injection is provided solely via the second fuel injector so that a greater percentage of post injected fuel may be ejected from the cylinder so that it may reach the oxidation catalyst to facilitate particulate filter regeneration. In this example, a single post fuel injection fuel pulse is provided, but additional fuel pulses may be provided. The post fuel injected fuel is injected late when the exhaust port opens at time t15 so that a higher percentage of injected fuel flows out of the cylinder. However, post fuel injection may be provided after the main injection and before the exhaust port opens. Further, if the post fuel injections time is early (e.g., near end of ignition), the first fuel injector may also provide post fuel injections. The post fuel injection is complete before the intake port opens at time t16. The cylinder cycle repeats beginning shortly after time t16.

In this way, fuel may be post injected during a cylinder cycle to facilitate particulate filter regeneration. The post fuel injection pulse widths are timed to increase the flow of post injected fuel to the oxidation catalyst so that less fuel may remain in the cylinder for a next cylinder cycle.

Referring now to FIG. 4, a method for regenerating a particulate filter positioned in an exhaust system downstream of a two stroke diesel engine is shown. The method of FIG. 4 may be stored as executable instructions in non-transitory memory in systems such as shown in FIG. 1. The method of FIG. 4 may be incorporated into and may cooperate with the systems of FIG. 1. Further, at least portions of the method of FIG. 4 may be incorporated as executable instructions stored in non-transitory memory while other portions of the method may be performed via a controller transforming operating states of devices and actuators in the physical world. The controller may employ engine actuators of the engine system to adjust engine operation, according to the methods described below.

At 402, method 400 determines vehicle operating conditions. Vehicle operating conditions may include, but are not limited to an amount of soot stored in a particulate filter, internal residual amount, particulate filter temperature, engine speed, engine load, driver demand torque. The vehicle operating conditions may be determined or inferred from sensor data received via controller 12 shown in FIG. 1. For example, the internal residual amount may be estimated responsive to engine speed, engine load, intake manifold pressure, and a position of an exhaust valve. The engine speed, engine load, intake manifold pressure, and exhaust valve position may reference one or more tables and functions that include empirically determined values of internal residual amount. The tables or functions output the cylinder residual amount estimate. Driver demand torque may be determined from accelerator pedal position and vehicle speed referencing a table or function that holds empirically determined values of driver demand torque. The function or table outputs the driver demand torque. Method 400 proceeds to 404.

At 404, method 400 operates the engine according to the operating conditions determined at 402. Fuel injection timing for pilot and main injections is based on the vehicle operating conditions determined at 402. Pilot fuel injections are short duration fuel injections that may be less than 4 mg. Pilot fuel injections start and end before top-dead-center compression stroke in the cylinder cycle in which they are injected. The pilot fuel injections may reduce engine combustion noise, control peak cylinder pressures, and adjust heat release within the cylinder. Main fuel injections are injections of a greatest amount of fuel that is injected during a cylinder cycle. The main fuel injections may range from 3 mg to 100 mg per cylinder cycle. Pilot fuel injections precede the main fuel injections. The first fuel injector may supply the pilot, main, and early post fuel injections. The second fuel injector may provide pilot fuel injections, main fuel injections, and early and late post injections. Boost pressure, throttle position, exhaust throttle position, timing of pilot and main fuel injections, and external EGR adjustments may be based on engine speed and load. Method 400 proceeds to 406.

At 406, method 400 judges if particulate filter (PF) regeneration is desired. Method 400 may judge that particulate filter regeneration is desired in response to an amount of soot stored in a particulate filter exceeding a threshold amount and engine load greater than a threshold load. If method 400 judges that particulate filter regeneration is desired, the answer is yes and method 400 proceeds to 408. Otherwise, the answer is no and method 400 proceeds to 440.

At 440, method 400 ceases PF regeneration via ceasing to inject post injection fuel. Further, method 400 may adjust engine boost pressure and exhaust throttle positions to cease particulate filter regeneration. Method 400 proceeds to exit.

At 408, method 400 begins to increase PF temperature. Method 400 may increase boost pressure and at least partially close the exhaust throttle to increase exhaust gas temperatures to begin PF regeneration. Method 400 proceeds to 410.

At 410, method 400 estimates internal residuals within an engine cylinder. Internal residuals are residuals (HC, NOx, and CO) that remain in a cylinder from a first combustion event (e.g., combustion of air and fuel in a cylinder) to a next second combustion event in the cylinder. The internal residuals do not exit the cylinder from the first combustion event to the next or second combustion event, except internal residuals may include residuals that exit the exhaust port and that are drawn back into the cylinder from the exhaust port before the second combustion event. Internal residuals do not include residuals that exit the exhaust port and reenter the cylinder via the intake port.

In one example, method 400 estimates the IEGR amount in the cylinder. In one example, the internal residual amount may be estimated by referencing one or more tables or functions via engine speed, engine load, boost pressure, and exhaust throttle position. The tables or functions hold empirically determined internal residual amount estimates. The tables or functions output the internal residual amount. Method 400 proceeds to 412.

At 412, method 400 determines a post fuel injection amount, start of post injection pulse width, and end of post injection pulse width. Early post fuel injections may occur ten crankshaft degrees after top dead center compression stroke and after a main fuel injection. Early post fuel injections may range from 1 mg to 10 mg. Late post injections are fuel injections that are preformed after combustion of the main fuel injection pulse is complete and before an exhaust port of the cylinder receiving the fuel closes during the cylinder's cycle. Early and late post injections may be useful for regenerating emissions control devices in the engine's exhaust system (e.g., a PF).

In one example, method 400 references one or more functions and/or tables that include post fuel injection fuel amount, start of post fuel injection pulse width, and end of fuel injection pulse width. The values in the tables are empirically determined and stored in controller memory. The tables and/or functions may be referenced via desired PF temperature, engine speed, engine load, and IEGR amount. The tables and/or function increase the post fuel injection amount when IEGR amount decreases. The post fuel injection amount may be increased when the IEGR amount is decreased because a larger fraction of post injected fuel may exit the cylinder when the IEGR amount is small. The tables and/or functions also decrease the post fuel injection amount when IEGR amount increases so that there is less fuel trapped in the cylinder from a first cycle of the cylinder to the next second cycle of the cylinder. In one example, the end of post injection pulse width is within five crankshaft degrees of exhaust port opening so that cylinder blowdown helps evacuate fuel injected to the cylinder. In addition, the start of post fuel injections may be advanced in response to an increasing IEGR amount so that the end of post fuel injections may also advance, thereby allowing all post injected fuel during a cylinder cycle to be injected before the exhaust port opens so that more post injected fuel may exit the exhaust port before the next cylinder cycle. The start of post fuel injections may be retarded in response to a decreasing IEGR amount so that the end of post fuel injections may also be retarded, thereby allowing larger post injection fuel pulses to end before exhaust port opening. The larger fuel pulse widths may increase temperature in the oxidation catalyst, thereby increasing exhaust temperatures that reach the PF. In one example, the post fuel injection pulses start at a time before the cylinder's exhaust port opens or when the cylinder's exhaust port opens. The post fuel injection fuel pulses end before the intake port opens during the cylinder stroke in which the fuel was injected as is shown in FIG. 3. Method 400 proceeds to 414.

At 414, method 400 provides the post fuel injection pulses to one or more engine cylinders via the first injector and the second injector, or only via the second fuel injector. The post fuel injections may be provided by both the first and second fuel injectors when the post fuel injections are early fuel injections. The second fuel injector may be the only fuel injector supplying late post injections. Method 400 proceeds to 416 after providing post fuel injections at the timings determined at 412.

At 416, method 400 judges if PF filter regeneration is complete. In one example, differential pressure sensor 71 outputs data that is indicative if soot stored in the PF is less than a threshold amount. If method 400 judges that PF filter regeneration is complete, the answer is yes and method 400 proceeds to exit. Otherwise, the answer is no and method 400 returns to 410.

Thus, the method of FIG. 4 provides for a particulate filter regeneration method, comprising: receiving sensor data to a controller; and adjusting a post injection fuel pulse width provided to a second fuel injector of a cylinder via the controller in response to an amount of internal residual in the cylinder as estimated from the sensor data. The particulate filter regeneration method includes where the internal residual is estimated from engine speed and engine boost pressure, and where the post injection fuel pulse width is provided during the cylinder cycle before exhaust port opening. The method includes where the second fuel injector is at an angle with respect to a wall of the cylinder such that fuel spray from the second fuel injector is directed toward an exhaust piston, and further comprising: adjusting a post injection fuel pulse width provided to a first fuel injector of the cylinder via the controller in response to the amount of residual in the cylinder as estimated from sensor data. The particulate filter regeneration method includes where the internal residual is estimated from engine speed and position of a valve in an exhaust system. The particulate filter regeneration method includes where adjusting the post injection fuel pulse width includes increasing the post injection fuel pulse in response to a decrease in the amount of internal residual in the engine cylinder. The particulate filter regeneration method includes where adjusting the post injection fuel pulse width includes decreasing the post injection fuel pulse in response to an increase in the amount of internal residual in the cylinder.

In addition, the particulate filter regeneration method includes where the post injection fuel pulse width is directly injected to a cylinder during a stroke of the cylinder where a piston uncovers an exhaust port and an intake port. The particulate filter regeneration method includes where the exhaust port is open an entire time the intake port is open during the stroke. The particulate filter regeneration method includes where the post fuel injection pulse width is provided to the second fuel injector of the cylinder during a cylinder cycle and where a main fuel injection pulse width is provided to a first fuel injector of the cylinder during the cylinder cycle.

The method of FIG. 4 also provides for a particulate filter regeneration method, comprising: receiving sensor data to a controller; adjusting a post injection fuel pulse width provided to a second fuel injector of a cylinder via the controller in response to an amount of internal residual in the cylinder as estimated from the sensor data; and injecting a post injection fuel amount to the cylinder via the second fuel injector, the second fuel injector including a spray cone directly impinging on an exhaust port of the cylinder. The particulate filter regeneration method includes where injecting the post injection fuel amount includes injecting fuel via the second fuel injector between a time the exhaust port opens and an intake port of the cylinder opens. The particulate filter regeneration method includes where a piston opens the intake port and the exhaust port. The particulate filter regeneration method further comprises injecting a main injection fuel amount to the cylinder via a first fuel injector. The particulate filter regeneration method further comprises adjusting the amount of internal residual in response to engine speed and load. The particulate filter regeneration method includes where the amount of internal residual is adjusted via adjusting boost pressure of the cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A particulate filter regeneration method, comprising:
   receiving sensor data to a controller; and
   adjusting a post injection fuel pulse width provided to a second fuel injector of a cylinder via the controller in response to an amount of internal residual in the cylinder as estimated from the sensor data.

2. The particulate filter regeneration method of claim 1, where the internal residual is estimated from engine speed and engine boost pressure, where the second fuel injector is at an angle with respect to a wall of the cylinder such that fuel spray from the second fuel injector is directed toward an exhaust piston.

3. The particulate filter regeneration method of claim 1, where the internal residual is estimated from engine speed and position of a valve in an exhaust system, and where the post injection fuel pulse width is provided during a cylinder cycle before an exhaust port opening.

4. The particulate filter regeneration method of claim 1, where adjusting the post injection fuel pulse width includes increasing the post injection fuel pulse in response to a decrease in the amount of internal residual in the cylinder, and further comprising:
   adjusting a post injection fuel pulse width provided to a first fuel injector of the cylinder via the controller in response to the amount of internal residual in the cylinder as estimated from the sensor data.

5. The particulate filter regeneration method of claim 1, where adjusting the post injection fuel pulse width includes decreasing the post injection fuel pulse in response to an increase in the amount of internal residual in the cylinder.

6. The particulate filter regeneration method of claim 1, where the post injection fuel pulse width is directly injected to the cylinder during a stroke of the cylinder where a piston uncovers an exhaust port and an intake port.

7. The particulate filter regeneration method of claim 6, where the post injection fuel pulse width is provided during a cylinder cycle before intake port opening.

8. The particulate filter regeneration method of claim 1, where the post injection fuel pulse width is provided to the second fuel injector of the cylinder during a cylinder cycle and where a main fuel injection pulse width is provided to a first fuel injector of the cylinder during the cylinder cycle.

9. A particulate filter regeneration method, comprising:
receiving sensor data to a controller;
adjusting a post injection fuel pulse width provided to a second fuel injector of a cylinder via the controller in response to an amount of internal residual in the cylinder as estimated from the sensor data; and
injecting a post injection fuel amount to the cylinder via the second fuel injector, the second fuel injector including a spray cone directly impinging on an exhaust port of the cylinder.

10. The particulate filter regeneration method of claim 9, where injecting the post injection fuel amount includes injecting fuel via the second fuel injector between a time the exhaust port opens and an intake port of the cylinder opens.

11. The particulate filter regeneration method of claim 10, where a piston opens the intake port and the exhaust port.

12. The particulate filter regeneration method of claim 9, further comprising injecting a main injection fuel amount to the cylinder via a first fuel injector.

13. The particulate filter regeneration method of claim 9, further comprising adjusting the amount of internal residual in response to engine speed and load.

14. The particulate filter regeneration method of claim 13, where the amount of internal residual is adjusted via adjusting boost pressure of the cylinder.

* * * * *